United States Patent

[11] 3,596,436

[72] Inventor Pierre Dassesse
    Jemeppe-Sur-Sambre, Belgium
[21] Appl. No. 9,559
[22] Filed Feb. 9, 1970
[45] Patented Aug. 3, 1971
[73] Assignee Solvay & Cie
    Brussels, Belgium
[32] Priority Feb. 10, 1969
[33] Belgium
[31] 69,856

[54] PROCEDURE FOR THE RECOVERY OF
     DIOLEFINS FROM A MIXTURE THEREOF WITH
     MONOOLEFINS
     8 Claims, 1 Drawing Fig.
[52] U.S. Cl. .................................. 55/19,
     55/59, 55/74, 55/180
[51] Int. Cl. ................................. B01d 53/02
[50] Field of Search .......................... 55/59—62,
     74, 77, 78, 161, 179, 180, 198

[56] References Cited
UNITED STATES PATENTS
3,061,992  11/1962  Russell ............................. 55/198 X 3,186,144  6/1965  Dow ................................. 55/180 X
3,306,006  2/1967  Urban ............................... 55/78 X Primary Examiner—Reuben Friedman
Assistant Examiner—R. W. Burks
Attorneys—Robert E. Burns and Emmanuel J. Lobato ABSTRACT: A cyclic process is provided for the recovery of diolefins from vapor mixtures thereof with monoolefins by selective adsorption over a solid adsorbent. A mixture of diolefins and monoolefins is circulated in the presence of a solid adsorbent whereby the diolefins are selectively adsorbed. After the solid adsorbent has adsorbed the diolefins, it is treated with superheated steam to cause desorption of the diolefins and the production of a mixture of gaseous diolefins and water vapor. The vapor mixture is then condensed and the diolefins are separated from water by decantation. The adsorbent is dried and cooled by flushing with the mixture of monoolefins from which diolefins have been removed, to complete the regeneration of the adsorbent so that it is suitable for reuse.

PATENTED AUG 3 1971
3,596,436
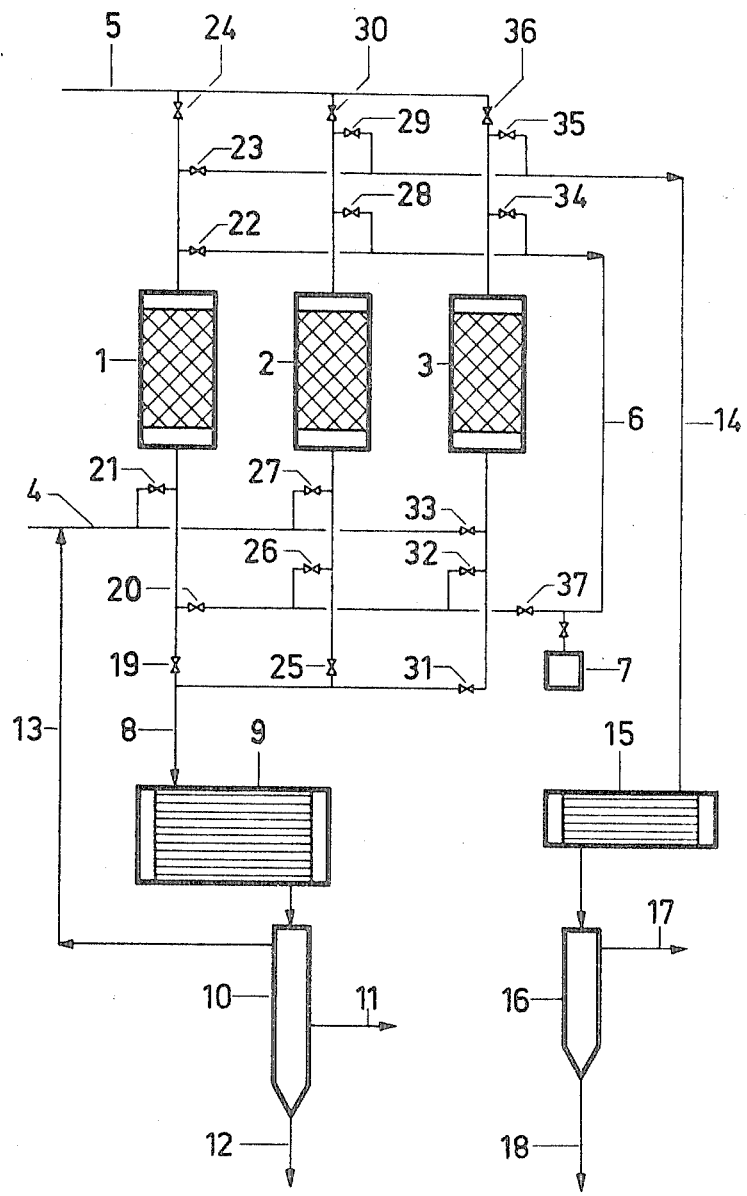

PROCEDURE FOR THE RECOVERY OF DIOLEFINS FROM A MIXTURE THEREOF WITH MONOOLEFINS

BACKGROUND OF THE INVENTION

This invention is directed to a process for the recovery of diolefins by selective absorption, starting from vapor mixtures thereof with monoolefins.

It is often difficult and costly to separate diolefins and monoolefins by known methods such as by distillation, condensation or extraction when these derivatives have physical and chemical properties which are similar.

This is particularly the case in the recovery of diolefins from vapor mixtures thereof with monoolefins. An example is in the production of rubbery copolymers of monoolefins and diolefins of which the better known are the ethylene-propylene-diene terpolymers. When polymerization is terminated, the copolymer is separated from the unreacted monomers. The latter are in the form of a vapor mixture comprising a high proportion of monoolefins and a low quantity of diolefins.

Although monoolefins are easily obtained by cracking from petroleum fractions, diolefins must be synthesized by means of rather complex processes. Since only a portion of the diolefins present in the polymerization medium is incorporated in the copolymer, the production of copolymers of monoolefins and diolefins is not economically feasible if the diolefins are not totally recovered and recycled.

Until now, the problem involving the recovery of diolefins from vapor mixtures thereof containing high proportions of monoolefins has not been solved satisfactorily.

SUMMARY OF THE INVENTION

A process has now been found by means of which it is possible to completely recover diolefins in admixture with a major proportion of monoolefins by selective adsorption on a solid adsorbent.

The present invention involves a cyclic process for the recovery of diolefins comprising:

a first stage of separating the diolefins from the monoolefins by circulating the mixture of diolefins and monoolefins on a solid adsorbent whereby the diolefins are selectively adsorbed, a second stage of separating the diolefins from the adsorbent by treating the adsorbent containing the diolefins with superheated steam, collecting the mixture of diolefins and steam, condensing this mixture and separating the diolefins from water by decantation, and a third stage of drying and cooling the adsorbent which is now freed of diolefins by circulating thereon the mixture of monoolefins which has been separated from diolefins in the first stage. In this manner, the adsorbent is in a suitable state for reuse for the adsorption or first stage of the process.

The apparatus used to carry out this process which also forms part of the present invention includes solid adsorbent disposed in a fixed bed in a plurality of enclosures means to contact the solid adsorbent with a vapor mixture of monoolefin and diolefin to adsorb the diolefin, means for withdrawing the monoolefins from the enclosures, means for feeding superheated steam into contact with said adsorbent to separate the adsorbed diolefins, means for removing a vapor mixture of steam and diolefin from said enclosure, decanting means to separate the mixture of diolefin and water, means for contacting said adsorbent with the separated monoolefins to dry said adsorbent and means for withdrawing from said enclosures a mixture of steam and monoolefins and for separating the monoolefins therefrom.

BRIEF DESCRIPTION OF THE DRAWING

In the drawing which illustrates one embodiment of the invention, the FIGURE is a schematic illustration of one type of apparatus which may be used to carry out the present process.

DESCRIPTION OF THE PREFERRED EMBODIMENTS

The process of the invention is applied to mixtures containing one or more monoolefins as well as one or more diolefins in the vapor phase. The present process is especially useful for treating mixtures of monoolefins and diolefins obtained when separating unconverted monomers during the production of rubbery copolymers by polymerization in the absence of solvent, while the copolymers are dispersed in the monomers maintained in the liquid state. Such a polymerization can be carried out very easily and with a particularly high diolefin conversion rate, by using the supported catalysts which have been described in U.S. Pat. No. 3,396,155 assigned to Solvay & Cie.

The mixtures obtained comprise one or more lower $\alpha$-olefins, i.e., $\alpha$-olefins containing up to about 6 carbon atoms such as ethylene, propylene, butene-1, isobutene, hexene-1 or 4-methylpentene-1 and a small proportion of a diolefin. The diolefins may be conjugated or nonconjugated, linear or cyclic, such as butadiene, pentadiene, hexadiene or dicyclopentadiene. Generally the diolefins used contain from 4 to about 16 carbon atoms, and for purposes of polymerization, the linear diolefins usually contain $\alpha$-unsaturation. However, the present process can be applied to vapor phase mixtures of monoolefins and diolefins which are obtained from any source.

The process according to the invention is especially suitable for the recovery of diolefins in which the physical properties, particularly the vapor tension under normal pressure, are generally in the same range as those of the monoolefins from which they must be separated. While the present process can be used to separate mixtures of monoolefins and diolefins in any proportion, it is especially economical and hence desirable when the diolefin content of the mixture is lower than that of the monoolefin, i.e. below 50 percent molar. It is particularly useful for separating mixtures of monoolefins and diolefins containing less than 20 percent molar and preferably less than 10 percent molar of diolefins. For example, in the production of terpolymers of ethylene, propylene and diene, the mixture of unreacted monomers generally contains a major portion of propylene and contains only a few molar percent of ethylene and diene. When the diene is selected from the relatively low molecular weight dienes, such as butadiene, pentadiene or hexadiene, it is practically impossible to make a complete recovery by a process other than the one according to the invention.

The solid materials used as adsorbent may be selected among those generally used for this purpose, such as those set forth in Perry's "Chemical Engineers' Handbook," McGraw Hill Book Co., 4th Edition, with particular reference to pp. 16–2 and 16–5; which pages are incorporated by reference.

The solid materials which are generally used with most advantage are those of the activated charcoal type. These materials are usually in the form of porous particles having a high specific surface as is more fully described in the above noted reference. They are used according to known methods such as in a fixed bed, movable bed or fluidized bed.

The fixed bed method is preferred due to its simplicity. The fixed bed method is carried out batchwise and a plurality of adsorption beds are generally employed.

The process according to the invention may also be carried out continuously by using the methods known as movable bed or fluidized bed. The various adsorption and desorption stages are then carried out in different apparatuses.

Whatever the method used, the process of the invention comprises a sequence of adsorption and desorption stages which form a closed cycle for the treatment of the solid adsorbent.

The first stage comprises the treatment of the solid adsorbent with the mixture of diolefins and monoolefins. It is during this stage that the diolefins are selectively adsorbed on the solid adsorbent. At the start of the diolefin adsorption stage, the solid adsorbent is preferably at a temperature lower than 50° C. and is saturated with monoolefins. The adsorbed monoolefins are gradually displaced by the diolefins which are present in the vapor phase mixture. The latter mixture is introduced at a temperature lower than 50° C., preferably at a temperature close to room temperature in order to favorably influence the adsorption of the diolefins. The temperature of the solid adsorbent varies only slightly due to the fact that the proportion of diolefins being adsorbed is usually very low compared to the total fluid flow. The pressure of the mixture may be raised above normal pressure if desired in order to influence favorably the adsorption of the diolefins.

When operating according to one of the continuous methods, a fraction of the solid adsorbent is continuously withdrawn and transferred to the devices where regeneration is carried out and a portion of solid adsorbent which is saturated with monoolefins is continuously reintroduced.

When operating batchwise, the fixed bed may be flushed with the mixture of diolefins and monoolefins until the presence of diolefins can be detected in the output mixture. The fixed bed is then submitted to the next regeneration stage and the mixture of diolefins and monoolefins is circulated in contact with another fixed bed.

The switching may be controlled automatically by a detector mounted under the output duct. The detector may for example be a chromatographer used to make automatic samplings at specific time intervals.

The second stage comprises the regeneration of the solid adsorbent by means of superheated steam, and the desorption of the diolefins. The superheated steam displaces the diolefins which are desorbed and are carried away as a vapor mixture with water vapor. The latter mixture is then condensed in a heat exchanger and decanted in order to recover the diolefins and water separately. In most applications, the mixture contains only one diolefin which, after having been dried for example by adsorption on a molecular sieve, may again be used directly. When many diolefins are used for the polymerization, the diolefins which are recovered after drying may be recycled by reestablishing suitable concentrations and this can be carried out by bringing a supplementary quantity of the diolefin the consumption of which has proportionately been higher.

The mixture of diolefins and water vapor also contains a small proportion of monoolefins which corresponds to the equilibrium of adsorption during the first stage. These monoolefins are not condensed in the heat exchanger and form a gaseous phase in the decanter. To prevent a loss of the quantity of diolefins present in this gaseous phase, it is possible to feed back this gaseous phase with a new supply of diolefins and monoolefins to the adsorption stage.

The temperature of the steam used during regeneration is not critical and generally the superheated steam available in the plant is used. The steam should be sufficiently overheated for example, about 2° or 3° C. above the saturation temperature to prevent any water condensation on the solid adsorbent. Heat insulation of the apparatuses in which this stage is carried out decreases the heat waste and enables the use of water vapor the latter having lower enthalpy.

When operating batchwise, the treatment of the solid adsorbent with superheated steam may be stopped when there are no more traces of diolefins in the water vapor which is removed from the fixed bed. Detection and commutation towards the next stage may also be automatic.

The third stage comprises the drying of the solid adsorbent. At the end of the second stage, the solid adsorbent is saturated with water at a temperature which is near that of superheated vapor (more than 100° C. if the second stage is carried out under atmospheric pressure). Drying is carried out by mere flushing with the mixture of monoolefins the latter being free of diolefins. This mixture may be sampled at the exit of the first stage where the diolefins are adsorbed. Drying of the solid prevents a decrease of the adsorption capacity, and it comes to an end when water vapor is no longer detected at the exit.

This stage also comprises the cooling of the solid adsorbent and saturation thereof with monoolefin. When drying is terminated, the adsorbent is saturated with monoolefins at a temperature which is higher than the one at which the adsorption of the diolefins is carried out. The solid adsorbent is cooled by flushing with the mixture of monoolefins free of diolefins. This mixture may be collected at the exit of the first diolefins adsorption state. The end of this stage is determined by measuring the temperature of the exit gases.

Usually the drying and cooling stage are combined. In this case, the monoolefin gaseous mixture which exits from the first stage is directly fed at the input of the water-saturated fixed bed which has undergone the second regeneration stage. At the start, flushing with the mixture of monoolefins assures the progressive drying of the bed starting from the entrance. Then cooling is carried out progressively.

When operating batchwise, the first and third stage may be combined and carried out in series without having to store, warm or cool the gaseous mixture between each passage over a fixed bed. In this combination, the first stage of adsorption of the diolefins is carried out in one or more fixed beds of solid adsorbent arranged in series. The gaseous mixture which exits, then comprises monoolefins only and is at a temperature lower than 50° C., preferably near room temperature. This mixture may be directly introduced at the entrance of the fixed bed(s) where cooling and drying of the solid adsorbent are carried out.

However, the stages of cooling and drying of the adsorbent may also be carried out separately. In this case, the gaseous mixture which exits from the bed(s) in the adsorption stage is introduced in the bed(s) in the cooling phase.

The mixture which exits from the first stage is slightly warm, i.e. usually between 50° C. and ambient temperature. It is directly introduced in the fixed bed(s) where drying of the solid adsorbent is carried out. The mixture which exits comprises water vapor which is extracted by passing the same through a condenser. Independently, one or more fixed beds are treated with superheated steam in order to carry out the second stage of regeneration of the solid adsorbent.

When the three stages last about the same period of time, it is sufficient to have three fixed beds of solid adsorbent to carry out the process according to the invention in a batchwise manner. The switchings are carried out simultaneously and can be controlled for example by a diolefin detector connected to the exit of the bed where the first stage is carried out.

When the various stages are of unequal durations, each may be carried out with beds having the same volume, mounted in series. The number of beds is proportional to the duration of the stage, and the switching should be programmed as a function of the duration of each stage. It is recommended that the end of each stage be automatically detected or that these various means be combined.

When operating continuously, each phase is carried out in a distinct apparatus or compartment containing a volume of solid adsorbent which is proportional to the duration of the stage. The solid adsorbent circulates continuously between each of these apparatuses or compartments.

The example which follows will serve to provide a better understanding of the advantages of the invention. This example illustrates the best mode currently contemplated for carrying out the present invention and must not be construed as limiting the scope thereof in any manner.

EXAMPLE

The process of the invention is used for the recovery of trans-1,4-hexadiene starting from a gaseous mixture in which it is highly diluted with propylene and ethylene. This mixture originates from a plant for the production of terpolymers of ethylene, propylene and trans-1,4-hexadiene. The mixture is fed at the rate of about 10.5 m.³/h. and comprises 92 percent by volume of propylene, 4.75 percent of ethylene and 3.25 percent of trans-1,4-hexadiene. The flow and the composition may vary slightly, depending on the polymerization conditions. The temperature of the mixture is about 15° C. and the absolute pressure is about 1.5 kg./cm.$^2$ abs.

The solid adsorbent is an activated charcoal known under the trademark "Sorbonorit" and produced by Societe Norit (Netherlands). The process is carried out by means of a batchwise fixed bed method.

With reference to the figures, three fixed beds 1, 2 and 3 each containing 50 kg. of activated charcoal are used. The gaseous mixture of propylene, ethylene and trans-1,4-hexadiene is introduced by means of pipe duct 4. The apparatus is supplied with superheated water vapor (absolute pressure of 1.05 kg./cm.$^2$ and temperature of 130° C.) by means of pipe duct 5.

The apparatus also comprises a duct 6 for transferring the mixture of propylene and ethylene. An automatic chromatographer 7 which analyzes the mixture of propylene and ethylene at every half hour is connected to this duct. When a peak characteristic of trans-1,4-hexadiene is registered on the chromatographer, the fixed beds are switched to another bed since the diene is no longer being adsorbed in the original bed.

Duct 8 is used to remove the mixture of water vapor and trans-1,4-hexadiene. This mixture is cooled in the heat exchanger 9 where it is condensed; water at a temperature of about 4° C. is used as the cooling means. The condensate is poured off in the decanter 10. About 1.8 liter/hour of liquid trans-1,4-hexadiene are collected at a temperature of about 15° C. It is removed through pipe duct 11. After having been dried, it is recycled towards the polymerization apparatuses. Water is poured off and it is extracted through the bottom of the decanter via duct 12. The decanter also comprises a gaseous phase comprising trans-1,4-hexadiene, propylene and ethylene. In order to prevent any loss of trans-1,4-hexadiene, the top portion of the decanter is connected with the input of the apparatus via duct 13.

The duct 14 is used to remove propylene and ethylene which may be mixed with water vapor. This water is condensed in the heat exchanger 15 which is cooled to room temperature by means of water. The separator 16 is used to remove water through duct 18 and to collect the mixture of propylene and ethylene by means of duct 17. This mixture is also recycled towards the polymerization apparatuses.

The three fixed beds 1, 2 and 3 are successively submitted to the stages defining a complete cycle of adsorption and desorption of trans-1,4-hexadiene. For example, when a new cycle begins for bed 1, at the start of the cycle, the activated charcoal from which bed 1 is made, is saturated with propylene and ethylene at a temperature substantially equal to room temperature. Valves 19, 20, 23, and 24 are closed. The valves 21 and 22 are open to permit the entry in the fixed bed 1 of the mixture of propylene, ethylene and trans-1,4-hexadiene and the exit of the mixture of propylene and ethylene. This exit mixture is substantially at the same temperature as the entrance mixture, i.e. 15° C. As the mixture passes through the bed, trans-1,4-hexadiene displaces propylene and ethylene in the adsorption stage. When a new cycle begins for bed 1, the second stage begins for bed 2. Valves 26, 27, 28 and 29 are closed and valves 25 and 30 are open to permit a supply of overheated steam from conduit 5 to pass through bed 2 and the removal of water and desorbed trans-1,4-hexadiene through conduit 8. Since the enclosures containing beds 1, 2 and 3 are carefully heat insulated, the temperature of the output mixture is higher than 100° C. which prevents all water condensation.

During this time, the third stage, i.e. preparing the adsorbent for reuse, is carried out in bed 3. For this operation, valves 31, 33, 34 and 36 are closed and valves 32, 35 and 37 are open to permit flushing of the bed 3 with the mixture of ethylene and propylene which exits from bed 1 and is transported through conduit 6. Flushing results in the desorption of water which may still be present in bed 3 and of cooling the same to a temperature close to room temperature. The mixture which exits from bed 3 contains water vapor which is condensed, separated and removed through the open valve 35 and through duct 14.

After about 4 hours, trans-1,4-hexadiene is no longer found in decanter 10 which means that desorption of trans-1,4-hexadiene from bed 2 is complete. Valves 30 and 25 are then closed, as well as valves 35 and 37, and valves 34, 32, 26 and 29 are opened. In this way the monoolefin exiting from bed 1 is still circulated directly through bed 3, although in the opposite direction and in addition the warm mixture which exits from the bed 3 is then circulated through the wet bed 2 to initiate the drying thereof. The mixture of propylene, ethylene and water vapor from bed 2 exits by way of valve 29 and is carried to heat exchanger 15 by way of conduit 14. In bed 1 adsorbing of trans-1,4-hexadiene is continued by passage of the mixture of propylene, ethylene and trans-1,4-hexadiene therethrough. Cooling down of bed 3 is also carried on by means of the mixture of propylene and ethylene which exits from bed 1.

After about 10 hours, the chromatograms which were periodically recorded by the chromatographer 7 indicate that bed 1 is saturated with trans-1,4-hexadiene. The trans-1,4-hexadiene which escapes from bed 1 at the end of the adsorption stage is adsorbed on the bed 3 and is therefore not lost. At this moment, flushing of the bed 1 is stopped and the mixture of propylene, ethylene and trans-1,4-hexadiene is supplied to bed 3. For this purpose, valves 21, 22, 26 and 29 are closed and valves 33, 37, 24 and 19 are opened. In this manner, bed 3 is used instead of bed 1, bed 2 is dried with the effluent from bed 3 and bed 1 is treated with superheated steam. After 14 hours from the start of the operation, all of the diene has been stripped from bed 1 and therefore treatment with superheated steam is stopped and the mixture which exits from bed 2 is passed through bed 1. After 20 hours, bed 3 is saturated with trans-1,4-hexadiene. The adsorption of the latter compound on bed 2 is carried out and bed 3 is then regenerated. Finally, after 30 hours, bed 1 is ready to start a new cycle.

The quantity of trans-1,4-hexadiene recovered in the decanter 10 represents more than 99 percent of the quantity present in the starting mixture. The quantity of superheated steam used during each regeneration stage is about 160 kg.

It will be realized that the process of the invention is particularly suitable to recover nearly all the trans-1,4-hexadiene which is diluted as a vapor in admixture with propylene and ethylene and this can be carried out with a low energy output. As a matter of fact, no warming or cooling of the gaseous mixtures should be carried out before passing the same through the fixed beds. The devices are simple, and comprise no movable parts and the operations are not complicated. Furthermore, there is no degradation of trans-1,4-hexadiene whatever the number of passages through the apparatuses.

What I desire to claim and secure by Letters Patent is:

1. Cyclic process for the recovery of diolefins from vapor mixtures thereof with monoolefins by selective adsorption over a solid adsorbent, which comprises the following successive stages,
   1. circulating a mixture of diolefin and monoolefin in contact with a solid adsorbent thereby to adsorb the diolefins;
   2. treating the solid adsorbent containing adsorbed diolefins with superheated steam to separate the diolefins from said adsorbent, condensing the thus-produced vapor mixture of water and diolefins and separating the diolefins and water by decantation, and
   3. drying and cooling the adsorbent by flushing with the mixture of monoolefins from which the diolefins have been removed so that the adsorbent is suitable for reuse in stage 1.

2. Process according to claim 1, in which the solid adsorbent is activated charcoal.

3. Process according to claim 1, in which the solid adsorbent is used in the form of granules disposed as a fixed bed.

4. Process according to claim 1, in which the solid adsorbent is used in the form of granules disposed as a movable bed.

5. Process according to claim 1, in which the solid adsorbent is used in the form of granules disposed as a fluidized bed.

6. Process according to claim 1, which comprises the successive batchwise treatments of the solid adsorbent disposed as a fixed bed.

7. Process according to claim 6, in which the treatment of the solid adsorbent by the mixture of diolefins and monoolefins is automatically stopped when the presence of diolefins in the mixture of monoolefins which exits from the fixed bed is detected and that at this moment, a permutation of the fixed bed is carried out, the bed in stage 1 being replaced by the bed in stage 3 and the bed in stage 1 is used for stage 2.

8. Apparatus for recovery of a diolefin from vapor mixtures thereof with a monoolefin by selective adsorption on a solid adsorbent comprising solid adsorbent disposed as a fixed bed in a plurality of enclosures, means to contact said vapor mixture with said solid adsorbent in order to adsorb said diolefin and thereby separate said diolefin from said monoolefin, means to withdraw said monoolefin from said enclosures, means to contact said solid adsorbent with superheated steam in order to separate said diolefin from said adsorbent, means for withdrawing a mixture of diolefin and steam from said enclosures, decanting means connected to said means for withdrawing the mixture of diolefin and steam to separate said diolefin and water, means connected to said means for withdrawing monoolefin to contact said solid adsorbent with said monoolefin in order to remove said steam from said adsorbent and means connected to said enclosures to remove a mixture of steam and monoolefin and to separate said monoolefin from said mixture of said steam and said monoolefin.